UNITED STATES PATENT OFFICE.

HAROLD ALVIN LEVEY, OF NEW ORLEANS, LOUISIANA.

PROCESS FOR THE MANUFACTURE OF CELLULOSE ACETATES.

1,330,543.  Specification of Letters Patent.  Patented Feb. 10, 1920.

No Drawing.  Application filed July 13, 1918. Serial No. 244,802.

*To all whom it may concern:*

Be it known that I, HAROLD ALVIN LEVEY, a citizen of the United States, residing at New Orleans, in the parish of Orleans and State of Louisiana, have invented a new and useful Improvement in Processes for the Manufacture of Cellulose Acetates, of which the following is a specification.

My invention relates to the art of producing acetates of cellulose and will be fully understood from the following specification. The preferred process according to my present invention is carried out as follows:

Step 1: Acetic, preferably glacial acetic acid, has chlorin gas added thereto in sufficient amount to produce a markedly yellow solution. This substance I hereinafter refer to as chlorinated acetic acid.

Step 2: 100 grams of clean cotton is treated with 550 c. c. of the chlorinated acetic acid above referred to, this amount being sufficient to thoroughly wet the cotton. The wetted cotton is treated in a closed container at a temperature of 65 to 80° C. for about one to two hours, the required period being determined by the form of the cotton and the degree of chlorination of the acetic acid. At the end of this treatment all of the long cotton fibers should be disintegrated into very short fibers and the mass should have an appearance somewhat like that of cottage cheese.

Step 3: The excess of acid is now expressed from the cotton, until the total mass has a weight of approximately 350 to 400 grams.

Step 4: From 200 to 250 grams of 100 per cent. acetic anhydrid or an equivalent quantity of anhydrid of less strength has dissolved therein 20 grams of anhydrous zinc chlorid or an equivalent quantity of moisture-containing zinc chlorid. This solution is then poured over the disintegrated cellulose fibers and the mass is heated to from 55 to 70° C., preferably with agitation which hastens the reaction and produces a more uniform product. The temperature should not be permitted to exceed 80° C. In about one hour there results a clear syrup with practically no cotton fibers in evidence.

Step 5: An amount of chlorinated acetic acid equal in weight to the cotton employed, that is, 100 grams, which chlorinated acetic acid may be that expressed from the cotton in step 3, *supra*, with the addition of an equal weight (100 grams of water) is now added to the plastic mass resulting from step 4 in small increments with continuous stirring. The mass is now kept at a temperature of 50 to 70° C. for from 12 to 36 hours, the completion of the treatment being determined by taking samples from time to time. When such a sample on falling into water in small drops turns into a white opaque mass the treatment is regarded as completed.

Step 6: The batch is now poured into water, benzin, carbon tetra-chlorid or a similar solvent which separates the cellulose ester from the free acid present. It should be then carefully washed free from traces of acid in water, warm water being recommended for this washing.

Step 7: The product is now dried at about 60 to 75° C. until the moisture content is 5 per cent. or lower.

The cellulose acetates thus prepared have a weight equal to 1.5 times the cotton employed and are soluble in ethyl acetate, ethyl butyrate and pyridin, and insoluble in benzin, carbon tetra-chlorid and ethyl alcohol.

Although the process above described constitutes the preferred process according to the present invention and produces what I regard as a distinctly superior product, it is possible to attain satisfactory results by various alternative procedures, aside from obvious variations of technique. Thus, for example, in place of employing cotton, various other cellulose containing bodies may be used. It is likewise possible to substitute for the initial treatment with chlorinated acetic acid, treatment with a dilute mineral acid or with a caustic alkali as is well understood. Likewise, other halogens may be substituted for chlorin without departure from the spirit of the invention. It should be noted that in step 5 it is possible to employ, in place of an aqueous solution of the chlorinated or halogenated acetic acid, an alcoholic solution or other mixture thereof with an hydroxy compound.

It should particularly be noted with respect to the above described process that a relatively small quantity of acetic anhydrid is employed in step 4, it having been heretofore considered necessary to employ at a corresponding stage of other processes upward of 2½ times the weight of the cellulose. The relatively great dilution (50 per cent.) of the chlorinated acetic acid employed in step 5, is likewise regarded as a distinct advance in the art.

While I have in the foregoing described in considerable detail one preferred process according to my invention together with some variants thereof, it will be understood that this is illustrative only and for the purpose of making the invention more clear and that the invention is not to be regarded as limited to the exact procedure described except in so far as such limitations appear in the accompanying claims, in which it is my intention to claim all novelty inherent in the invention as broadly as is permissible in view of the prior art.

What I claim as new, and desire to secure by Letters Patent is:

1. As a composition of matter, cellulose acetate soluble in ethyl acetate, ethyl butyrate and pyridin and insoluble in benzin, carbon tetra-chlorid and ethyl alcohol.

2. The method of preparing esters of cellulose which consists in acting upon a cellulose containing body with chlorinated acetic acid to initially decompose the cellulose fibers, treating the decomposed fibers with zinc chlorid and acetic anhydrid to effect complete solution of the cellulose, and acting upon the dissolved cellulose with a mixture of chlorinated acetic acid and a hydroxyl-group containing solvent.

3. The method of preparing acetates of cellulose which consists in initially disintegrating cellulose, effecting a solution of the disintegrated cellulose by zinc chlorid and acetic anhydrid, and treating the cellulose solution with a mixture of halogenated acetic acid and a hydroxyl-group containing solvent.

4. In the process of producing acetates of cellulose, treating cellulose with chlorinated acetic acid and acting upon the treated cellulose with less than $2\frac{1}{2}$ times the weight of the dry cellulose of acetic acid and a hydrolyzing catalyst.

5. The step in the method of preparing acetates of cellulose which consists in acting upon a cellulose solution with a dilute solution of halogenated acetic acid.

6. The step in the method of preparing acetates of cellulose which consists in acting upon a cellulose solution with a dilute solution of chlorinated acetic acid.

7. The method of preparing acetates of cellulose which consists in acting upon cellulose with chlorinated acetic acid to initially disintegrate the cellulose, expressing the excess acid, treating the decomposed cellulose freed from excess acid with zinc chlorid and acetate anhydrid, thereby bringing the cellulose into solution, and treating the solution with a dilute aqueous solution of chlorinated acetic acid.

HAROLD ALVIN LEVEY.